(12) United States Patent
Chen

(10) Patent No.: US 9,129,573 B2
(45) Date of Patent: Sep. 8, 2015

(54) IMAGE DISPLAY SYSTEM AND METHOD

(75) Inventor: Eddy Giing-Lii Chen, Miao-Li County (TW)

(73) Assignee: INNOLUX CORPORATION (TW)

( * ) Notice: Subject to any disclaimer, the term of this patent is extended or adjusted under 35 U.S.C. 154(b) by 1020 days.

(21) Appl. No.: 13/242,295

(22) Filed: Sep. 23, 2011

(65) Prior Publication Data

US 2012/0223942 A1 Sep. 6, 2012

(30) Foreign Application Priority Data

Mar. 1, 2011 (TW) .............................. 100106610 A

(51) Int. Cl.
*G06T 15/00* (2011.01)
*G09G 5/10* (2006.01)
*G06F 3/038* (2013.01)
*G09G 3/36* (2006.01)
*G09G 3/00* (2006.01)
*H04N 13/04* (2006.01)

(52) U.S. Cl.
CPC .............. *G09G 3/3648* (2013.01); *G09G 3/003* (2013.01); *H04N 13/0438* (2013.01); *H04N 13/0497* (2013.01); *G09G 3/3655* (2013.01); *G09G 2300/0426* (2013.01); *G09G 2300/0842* (2013.01); *G09G 2300/0861* (2013.01); *G09G 2300/0876* (2013.01); *G09G 2310/0237* (2013.01); *G09G 2320/0209* (2013.01)

(58) Field of Classification Search
None
See application file for complete search history.

(56) References Cited

U.S. PATENT DOCUMENTS

| | | | |
|---|---|---|---|
| 7,307,609 B2 | 12/2007 | Chang | |
| 7,345,659 B2 | 3/2008 | Chang | |
| 7,345,664 B2 | 3/2008 | Chang | |
| 7,345,665 B2 | 3/2008 | Chang | |
| 7,348,952 B2 * | 3/2008 | Chang | 345/87 |
| 2006/0274017 A1 * | 12/2006 | Nakao | 345/98 |
| 2008/0136983 A1 * | 6/2008 | Huang | 349/38 |

* cited by examiner

*Primary Examiner* — Kate Luo
(74) *Attorney, Agent, or Firm* — Lowe Hauptman & Ham, LLP

(57) ABSTRACT

An image display system and method. A pixel of the system has a latch circuit and a display circuit. According to a scan line signal, the latch circuit receives and temporarily stores a data line signal. The display circuit works according to a reset signal and a set signal. According to the reset signal, the display circuit resets a voltage level of a control terminal of liquid crystal materials of the pixel. According to the set signal, the display circuit receives the data line signal stored in the latch circuit, to adjust the control terminal of the liquid crystal materials and thereby the liquid crystal materials are rotated and the expected image of the pixel is displayed accordingly. The active interval of the reset signal is arranged after a last scan line signal is disabled and prior to the enabling of the set signal.

9 Claims, 12 Drawing Sheets

IMAGE DISPLAY SYSTEM AND METHOD

CROSS REFERENCE TO RELATED APPLICATIONS

This application claims priority of Taiwan Patent Application No. 100106610, filed on Mar. 1, 2011, the entirety of which is incorporated by reference herein.

BACKGROUND OF THE DISCLOSURE

1. Field of the Disclosure

The present disclosure relates to an image display system and an image display method, and in particular relates to a pixel structure for each pixel of a pixel array within a liquid crystal display (LCD) panel of an image display system and an operating method thereof.

2. Description of the Related Art 3D glasses are commonly used in 3D display technology. A shutter 3D technology is commonly used in 3D glasses. According to the shutter 3D technology, the glass for the right eye is disabled to be opaque when the glass for the left eye is enabled to be transparent, so that the audience can watch left eye images. Oppositely, when the glass for the right eye is enabled to be transparent, the glass for the left eye is disabled to be opaque, so that the audience can watch right eye images.

FIG. 1 is timing diagram depicting how a 3D video is displayed by a pixel array within a typical LCD panel. The time period t1 corresponds to the write time of one left eye image (corresponding to one scanning period of a typical pixel array), and the time period t2 corresponds to the hold time of the left eye image (corresponding to one blanking period of the typical pixel array). During the time period t2, the glass for the left eye of a pair of 3D glasses is enabled and the glass for the right eye of the pair of 3D glasses is disabled, so the audience can watch the left eye image. The time periods t3 and t4 correspond to the write time and the hold time of one right eye image, respectively. During the time period t4, the glass for the right eye is enabled and the glass for the left eye is disabled, so that the audience can watch the right eye image. For another left eye image, the time periods t5 and t6 correspond to the write time and the hold time, respectively. During the time period t6, the glass for the left eye is enabled and the glass for the right eye is disabled, so that the audience can watch the new left eye image.

The aforementioned 3D display, however, considerably affects the brightness of the displayed images. It is because the displayed images are limited to be shown to the audience during the hold time (non-scanning periods, i.e., limited to blanking periods).

The aforementioned 3D display further results in crosstalk problems. For example, referring to the right eye image written into the pixel array during the time period t3, because the bottom rows of the right eye image are written at the end of the time period t3, the liquid crystal materials of the bottom rows may not be completely rotated to their proper orientation before the enabling of the glass for the right eye (enabled during the subsequent time period t4). Therefore, an incorrect right eye image with errors at the bottom rows may be shown to the audience during the time period t4.

To deal with the aforementioned problems, novel image display systems are proposed, which contain several novel pixel structures and the operation of the pixels are discussed.

BRIEF SUMMARY OF THE DISCLOSURE

Image display systems are disclosed in the application. The disclosed image display system contains a liquid crystal display (LCD) panel having a pixel array with a novel pixel structure as detailed below.

A pixel in accordance with an exemplary embodiment of the disclosure includes a latch circuit and a display circuit. The latch circuit receives and temporarily stores a data line signal according to a scan line signal. The operation of the display circuit is based on a reset signal and a set signal. According to the reset signal, the display circuit resets a voltage level of a control terminal controlling liquid crystal materials corresponding to the pixel. According to the set signal, the display signal receives the data temporarily stored in the latch circuit to adjust the voltage level of the control terminal accordingly. In this manner, the liquid crystal materials controlled via the control terminal are rotated and the pixel displays the expected image. Note that the reset signal is enabled after a scan line signal of a last row of the pixel array is disabled and before the set signal is enabled.

The disclosure further discloses an image display method, to drive liquid crystal materials of each pixel of a pixel array within a liquid crystal display panel.

The disclosed method includes receiving and temporarily storing a data line signal according to a scan line signal, resetting a voltage level of a control terminal of liquid crystal materials associated with the concerned pixel according to a reset signal, and receiving the temporarily stored data line signal according to a set signal to adjust the voltage level of the control terminal and thereby control rotations of the liquid crystal materials. The reset signal is enabled after a scan line signal of a last row of the pixel array is disabled and before the set signal is enabled.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims.

The structure of each pixel of the pixel array within a liquid crystal display panel of the disclosed image display system is detailed later.

Figure 1:
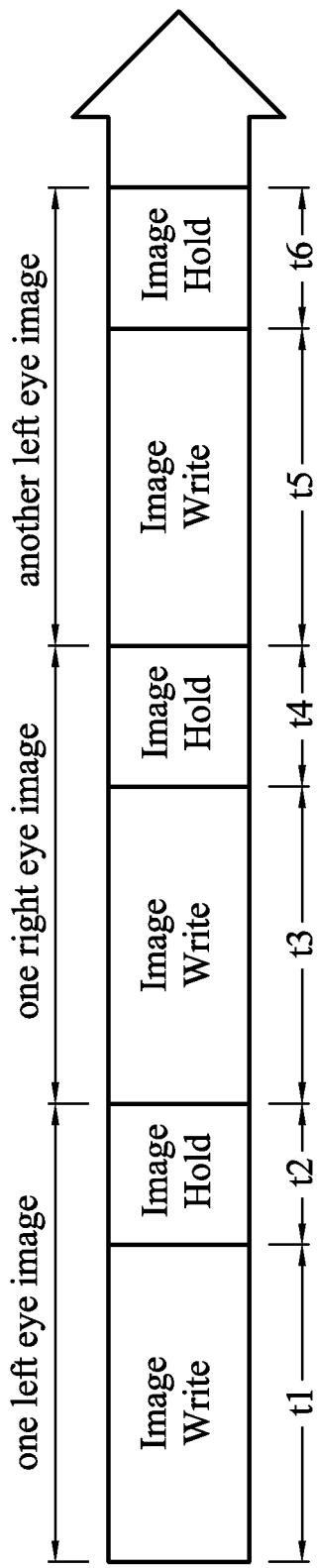
FIG. 1 is a timing diagram depicting how a 3D image is shown by a pixel array of a typical liquid crystal display panel.
Figure 2A:
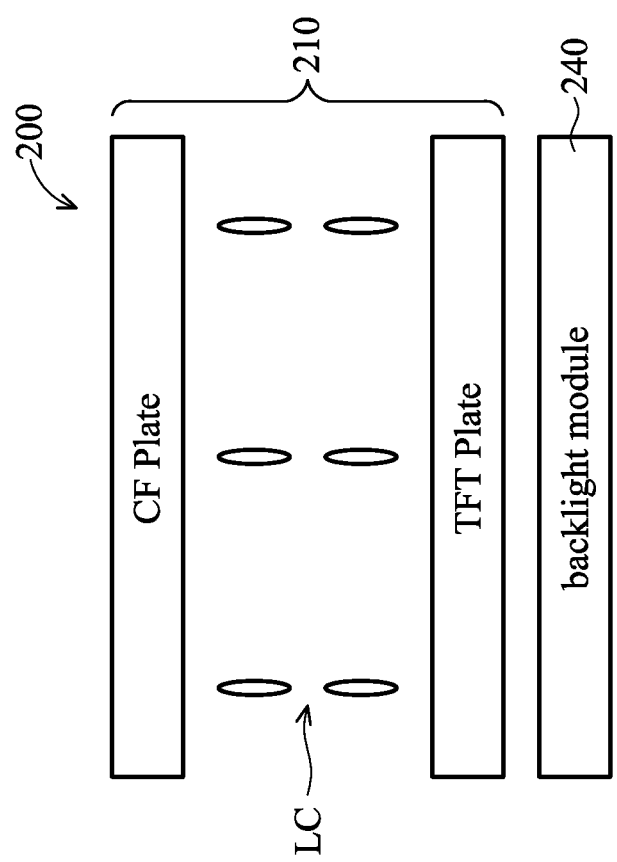
FIG. 2A is a cross section diagram illustrating an image display system 200 in accordance with an exemplary embodiment of the disclosure.

FIG. 2A is a cross section diagram illustrating an image display system 200 in accordance with an exemplary embodiment of the disclosure, and the liquid crystal display panel 210 of the image display system 200 is shown. The liquid crystal display panel 210 includes a color filter (CF) substrate, liquid crystal materials (LC) and a TFT substrate. As shown, the disclosed image display system may further include a backlight module 240 disposed at the back of the liquid crystal display panel 210 to provide light to the liquid crystal display panel 210.

Figure 2B:
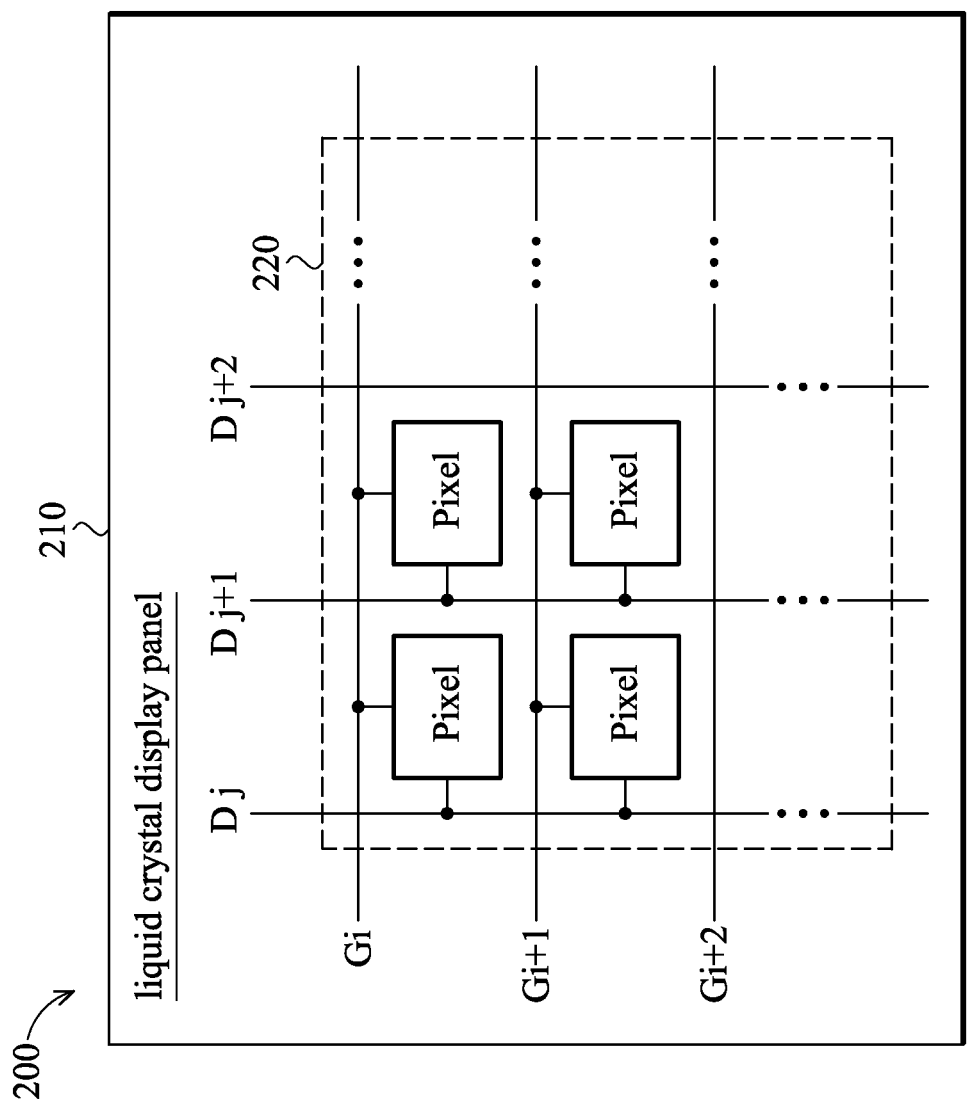
FIG. 2B illustrates a top view of the image display system 200.

FIG. 2B shows the top view of the image display system 200. The image display system 200 includes a liquid crystal display panel 210 having a plurality of scan lines Gi, Gi+1, Gi+2 . . . , a plurality of data lines Dj, Dj+1, Dj+2 . . . and a pixel array 220 defined by the scan lines and the data lines. Note that in multiple domain display technology, more than one pixel may be controlled by the same scan line and the same data line.

Figure 2C:
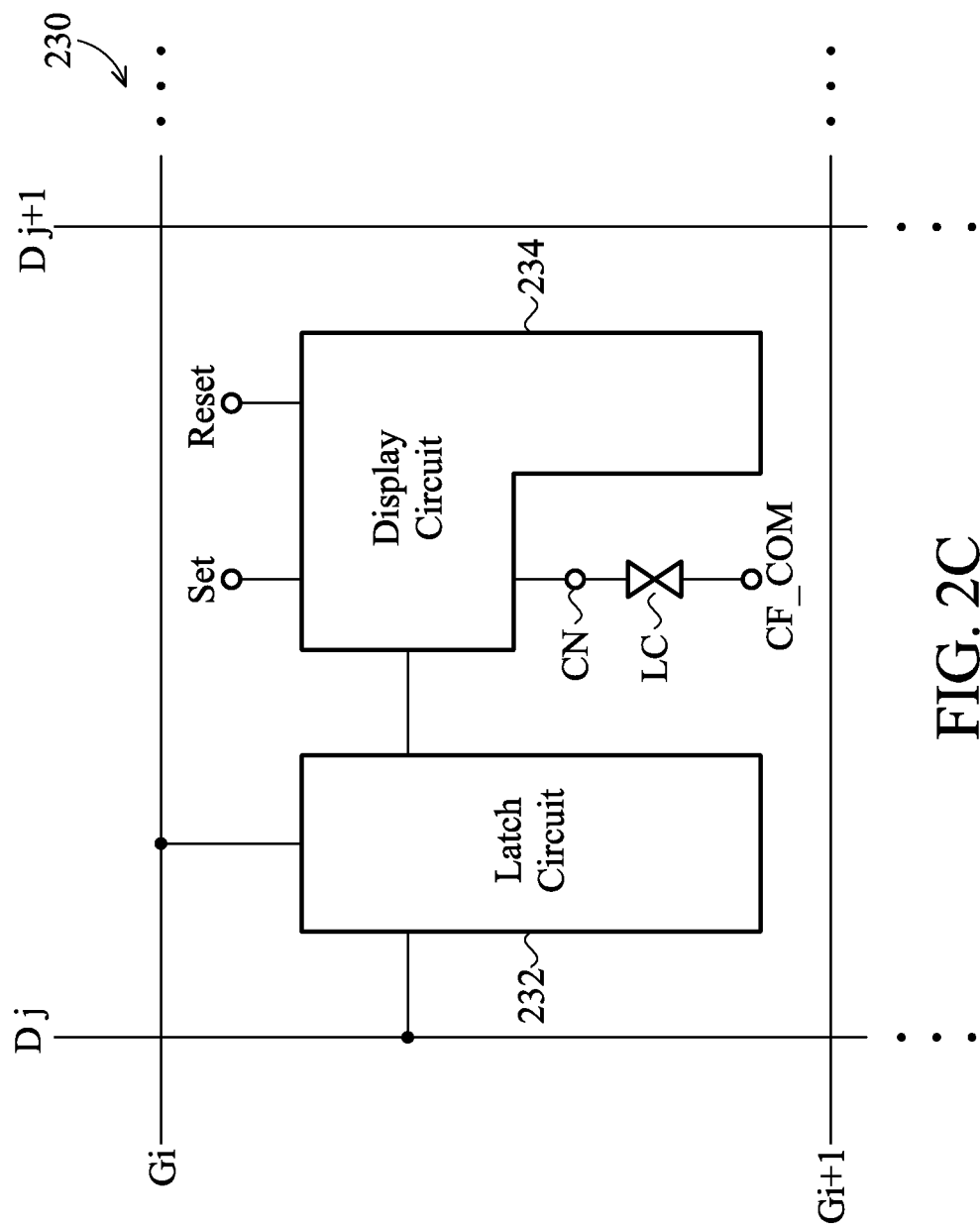
FIG. 2C illustrates a pixel structure in accordance with an exemplary embodiment of the disclosure.

FIG. 2C illustrates a pixel structure in accordance with an exemplary embodiment of the disclosure. The liquid crystal materials associated with the pixel 230 are labeled LC. The liquid crystal materials LC are controlled via a control terminal CN, and are further coupled to a common electrode CF_COM. The pixel 230 is coupled to a scan line Gi and a data line Dj, and includes a latch circuit 232 and a display circuit 234. According to a scan line signal transmitted by the scan line Gi, the latch circuit 232 receives and temporarily stores a data line signal transmitted by the data line Dj. Hereinafter, for simplicity, the scan line and the scan line signal transmitted thereon are labeled the same, and the data line and the data line signal transmitted thereon are labeled the same. The display circuit 234 works according to a reset signal Reset and a set signal Set. According to the reset signal Reset, the display circuit 234 resets a voltage level of the control terminal CN controlling the liquid crystal materials LC of the pixel 230. According to the set signal Set, the display circuit 23 receives the data line signal Dj temporarily stored in the latch circuit 232, and adjusts the voltage level of the control terminal CN accordingly and thereby controls rotations of the liquid crystal materials LC. In this manner, the pixel 230 displays the expected image.

Figure 3:
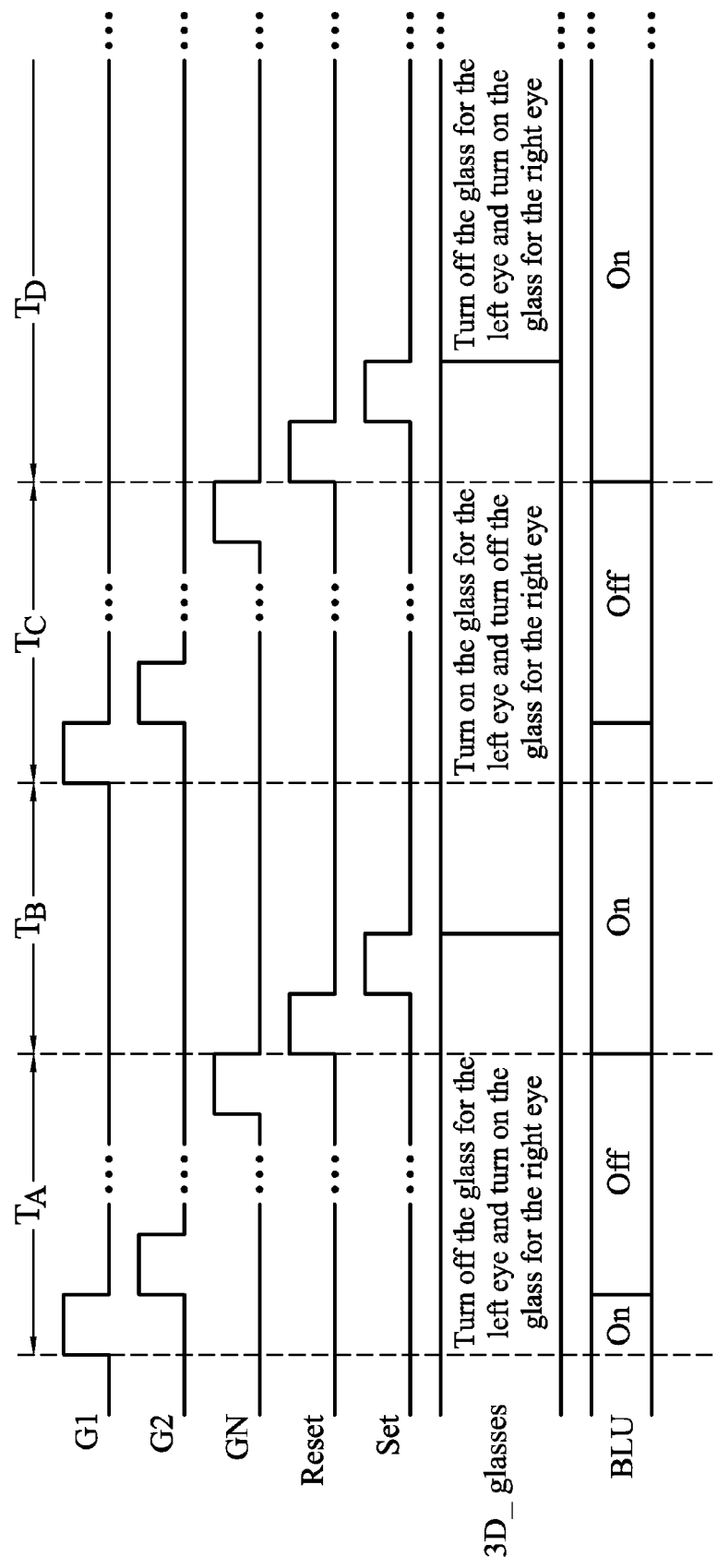
FIG. 3 is a timing diagram depicting signals controlling an image display system with the pixel structure of FIG. 2C.

FIG. 3 is a timing diagram depicting how the disclosed image system works. The time period TA is defined as a scanning period in which the scan lines G1 . . . GN of the pixel array are enabled in turn, so that the latch circuits of all pixels receive and temporarily store data of an image that is going to be displayed by the system. The time period TB is a "non-scanning period," designed for the reset signal Reset and set signal Set. As shown, the enable period of the reset signal Reset is designed after the scan line signal of a last row GN is disabled and before the set signal Set is enabled. The display circuits of all pixels may use the same reset signal Reset and the same set signal Set. In this manner, control terminals controlling liquid crystal materials of all pixels are reset at the same time by the reset signal Reset and then set at the same time according to the set signal Set. The image data temporarily stored during the time period TA doesn't affect the liquid crystal materials until the set signal Set is enabled, and the status of the liquid crystal materials is hold until the next enabling of the reset signal Reset. Note that a specific time period—after the set signal Set is switched to be enabled and before the reset signal Reset is switched to be enabled—is suitable for image display. Compared to typical 3D display technology, a much longer time for image display is available by the disclosed techniques. The brightness problem in typical 3D displays is readily solved.

Note that it may take a considerable amount of time to rotate the liquid crystal materials to the expected orientations when setting the control terminals of the liquid crystal materials according to the set signal Set. To ensure that only correct images are shown to the audience, the backlight module of the image display system may be specially designed. For example, the backlight module may be turned on after the liquid crystal materials have been rotated to their steady states and may be turned off when the reset signal Reset is switched to be enabled—referring to the backlight module control timing BLU shown in FIG. 3. In this manner, the crosstalk problem of typical 3D image displays is solved.

For 3D display, the image display system may further include a pair of 3D glasses. The 3D glasses may work according to the shutter 3D technology. The switching between the glass for the right eye and the glass for the left eye may depend on the set signal Set, and one example is shown as the 3D glasses control timing 3D glasses of FIG. 3. During the time period TA, one left eye image may be received and temporarily stored in the latch circuits within the pixel array. By enabling the set signal Set during the time period TB, the liquid crystal materials are rotated and the left eye image is displayed. To show the audience the left eye image that is being displayed, the glass for the right eye of the 3D glasses is turned off and the glass for the left eye of the 3D glasses is turned on subsequently. Proceeding to the time period TC, one right eye image is received and temporarily stored in the latch circuits within the pixel array. By enabling the set signal Set during the time period TD, the liquid crystal materials are rotated and the right eye image is displayed. To show the audience the right eye image that is being displayed, the glass for the right eye of the 3D glasses is turned on and the glass for the left eye of the 3D glasses is turned off subsequently.

Figure 4:
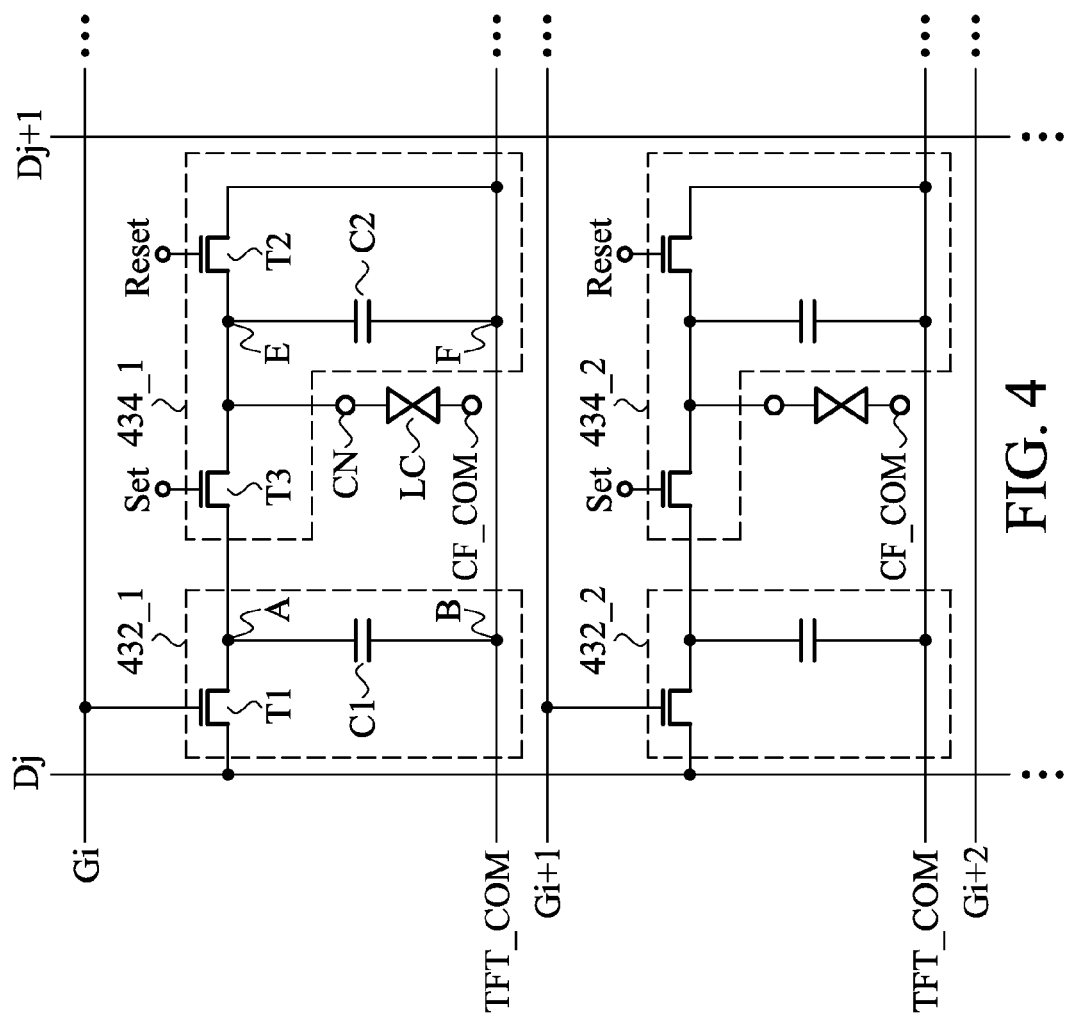
FIG. 4 illustrates a circuit of a pixel structure in accordance with an exemplary embodiment of the disclosure.

FIG. 4 depicts a pixel structure in accordance with an exemplary embodiment of the disclosure. In this paragraph, one pixel coupled to the scan line Gi and data line Dj and including a latch circuit 432_1 and a display circuit 434_1 is discussed. The latch circuit 432_1 includes a first capacitor C1 having a first terminal A and a second terminal B opposite to the first terminal A and a first TFT T1. The first TFT T1 is controlled by the scan line signal Gi and is operative to couple the data line signal Dj to the first terminal A of the first capacitor C1. The display circuit 434_1 includes a second TFT T2, a third TFT T3 and a second capacitor C2. The second TFT T2 is controlled by the reset signal Reset, to reset the voltage level of a control terminal CN controlling the liquid crystals LC of the pixel to a reset voltage level. The third TFT T3 is controlled by the set signal Set, and is operative to couple the first terminal A of the first capacitor C1 to the control terminal CN of the liquid crystal materials LC. The second capacitor C2 is an optional component chosen by the user. A first terminal E of the second capacitor C2 is coupled to the control terminal CN of the liquid crystal materials LC. In the embodiment shown in FIG. 4, a common electrode line (labeled TFT_COM) is provided on the liquid crystal display panel 210. The common electrode line TFT_COM is coupled to the second terminal B of the first capacitor C1, the second terminal F of the second capacitor C2 and the second TFT T2. A fixed voltage level provided by the common electrode TFT_COM may be used as the reset voltage level. Other pixels of the pixel array may be formed by the similar pixel structure. For example, a pixel coupled to the scan line Gi+1 and data line Dj includes a latch circuit 432_2 and a display circuit 434_2.

This paragraph discusses the operation of the pixel structure of FIG. 4 in accordance with the timing diagram of FIG. 3. When the pixel array is scanned (e.g., during the time period TA), the data line signal Dj is stored to the first capacitor C1 via the first TFT T1 in accordance with the enabling of the scan line Gi, and, by the subsequent enabling of the reset signal Reset, the second TFT T2 is turned on to reset the control terminal CN of the liquid crystal materials LC to the fixed voltage level provided at the common electrode line TFT_COM. Then, by disabling the reset signal Reset and enabling the set signal Set, the second TFT T2 is turned off and the third TFT T3 is turned on, and the electric charges stored in the first capacitor C1 are shared to the liquid crystal materials LC and the second capacitor C2 (i.e. charge sharing effect). The voltage level of the control terminal CN of the liquid crystal materials LC is adjusted accordingly, and thereby the liquid crystal materials LC are rotated. Note that the connection between the latch circuit 432_1 and the display circuit 434_1 is limited to the enable state of the set signal Set, and therefore when the latch circuit 434_1 is receiving and storing image data of the next frame, the display circuit 434_1 is not affected by the action of the latch circuit 434_1 and display of the present frame is maintained.

However, because the disclosed technique involves a charge sharing effect, the first capacitor C1 generally should be a large-sized capacitor to provide sufficient electric charges which are shared to the control terminal CN of the liquid crystal materials LC and thereby rotate the liquid crystal materials to the expected orientation. The large-sized first capacitor C1 may dramatically reduce the aperture ratio. To deal with the aperture ratio reduction, FIG. 5A illustrates another pixel structure in accordance with an exemplary embodiment of the disclosure.

Figure 5A:
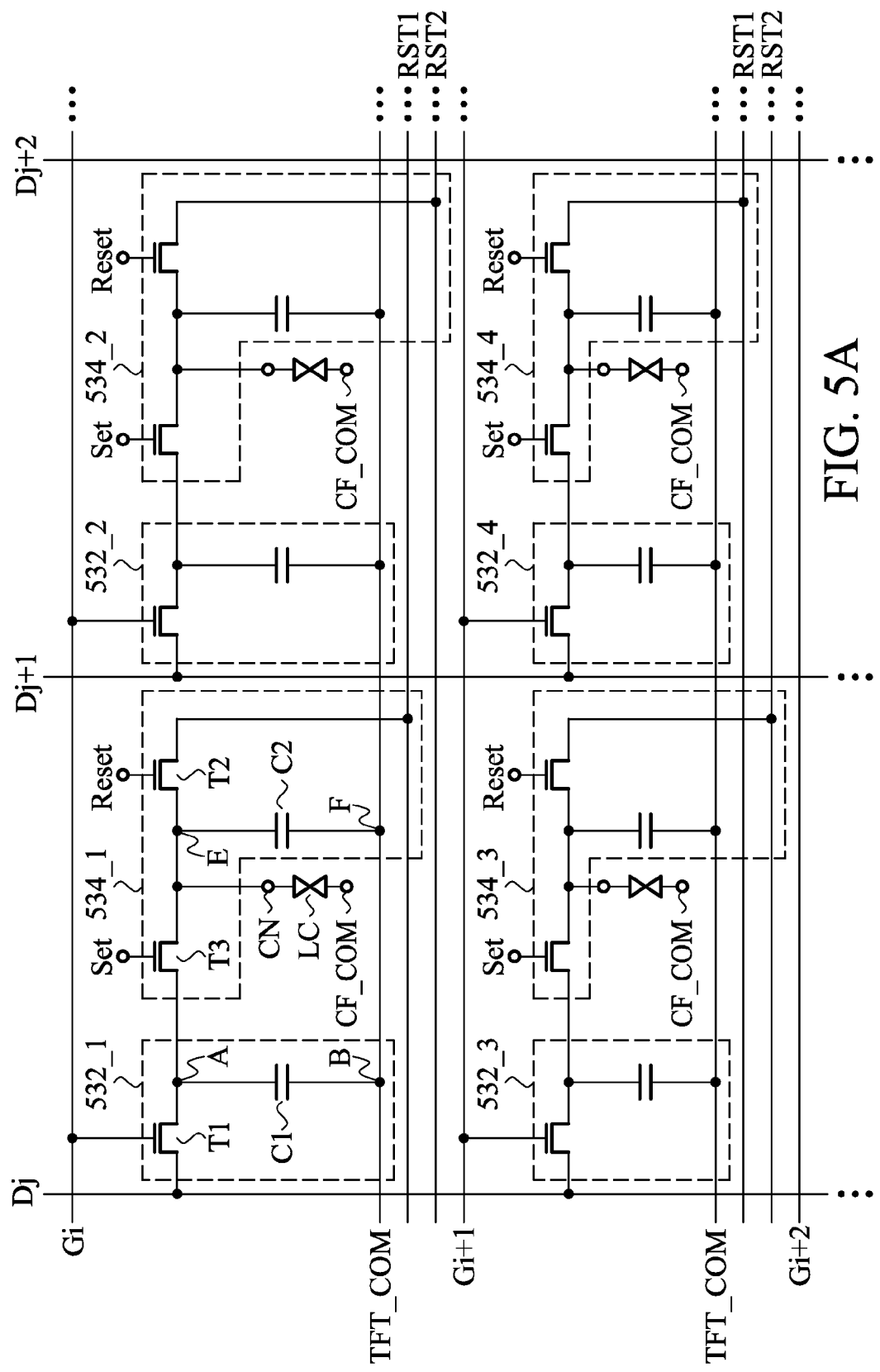
FIG. 5A illustrates a circuit of a pixel structure in accordance with another exemplary embodiment of the disclosure.

Referring to FIG. 5A, in addition to the common electrode line TFT_COM providing the fixed voltage level, a first signal line RST1 and a second signal line RST2 transmitting floating voltages are provided. In the pixel array, every first capacitor C1 and every second capacitor C2 are coupled to the fixed voltage level at the common electrode line TFT_COM in the same manner as that shown in FIG. 4. However, there is a special design in the source of the reset voltage level. Referring to the pixel coupled to the scan line and data line Dj, the pixel includes a latch circuit 532_1 and a display circuit 534_1, wherein the second TFT T2 is coupled to the first signal line RST1 and uses a first signal transmitted by the first signal line RST1 to obtain the reset voltage level. Referring to the pixel coupled to the scan line Gi and data line Dj+1, the pixel includes a latch circuit 532_2 and a display circuit 534_2, and uses a second signal provided at the second signal line RST2 to obtain the reset voltage level. Referring to the pixel coupled to the scan line Gi+1 and data line Dj, the pixel includes a latch circuit 532_3 and a display circuit 534_3, and uses the second signal provided at the second signal line RST2 to obtain the reset voltage level. Referring to the pixel coupled to the scan line Gi+1 and data line Dj+1, the pixel includes a latch circuit 532_4 and a display circuit 534_4, and uses the first signal provided at the first signal line RST1 to obtain the reset voltage level. Simply put, adjacent pixels are coupled to different signal lines to obtain the reset voltage level.

Figure 5B:
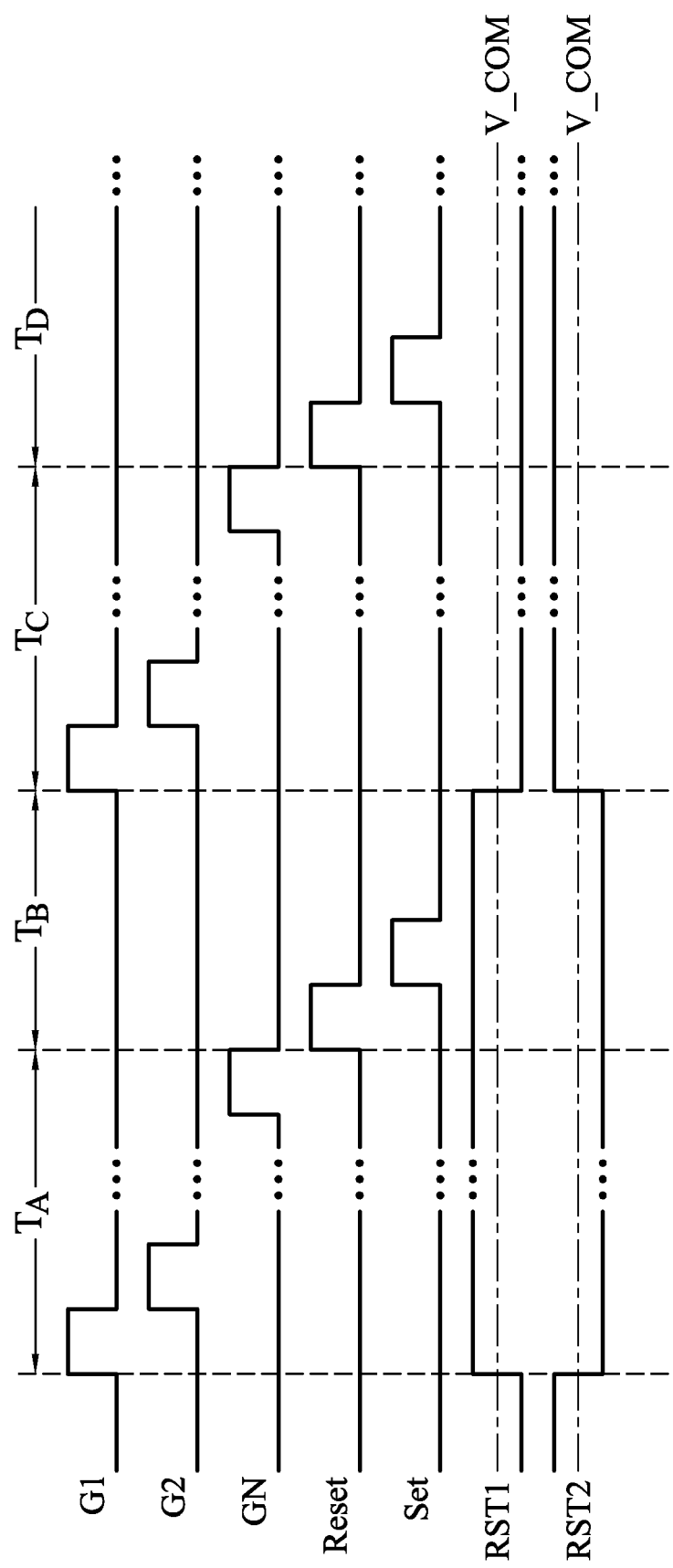
FIG. 5B is a timing diagram further depicting signals transmitted by the first signal line RST1 and the second signal line RST2 shown in FIG. 5A in accordance with an exemplary embodiment of the disclosure.

FIG. 5B is a timing diagram, further depicting the signals transmitted by the first signal line RST1 and the second signal line RST2. With reference to the fixed voltage level (labeled V_COM) provided by the common electrode line TFT_COM, the first signal on the first signal line RST1 switches between a positive polarity and a negative polarity. Note that the first signal on the first signal line RST1 and the second signal on the second signal line RST2 are opposite in phase. As shown, the reset voltage is biased to deviate from the fixed voltage level V_COM. In this manner, the control terminal CN of the liquid crystal materials LC is pre-charged to a certain level during the enabling of the reset signal Reset. Therefore, a normal-sized first capacitor C1 is good enough to drive the control terminal CN of the liquid crystal materials LC to rotate the liquid crystal materials to the expected orientation. The positive/negative polarity switching is for polarity inversion of the liquid crystal materials, and the timing of the positive/negative polarity switching may occur when refreshing to scan another frame. For example, when the scan line signal of the first row G1 is switched to be enabled, the positive/negative polarity switching may occur.

Figure 6A:
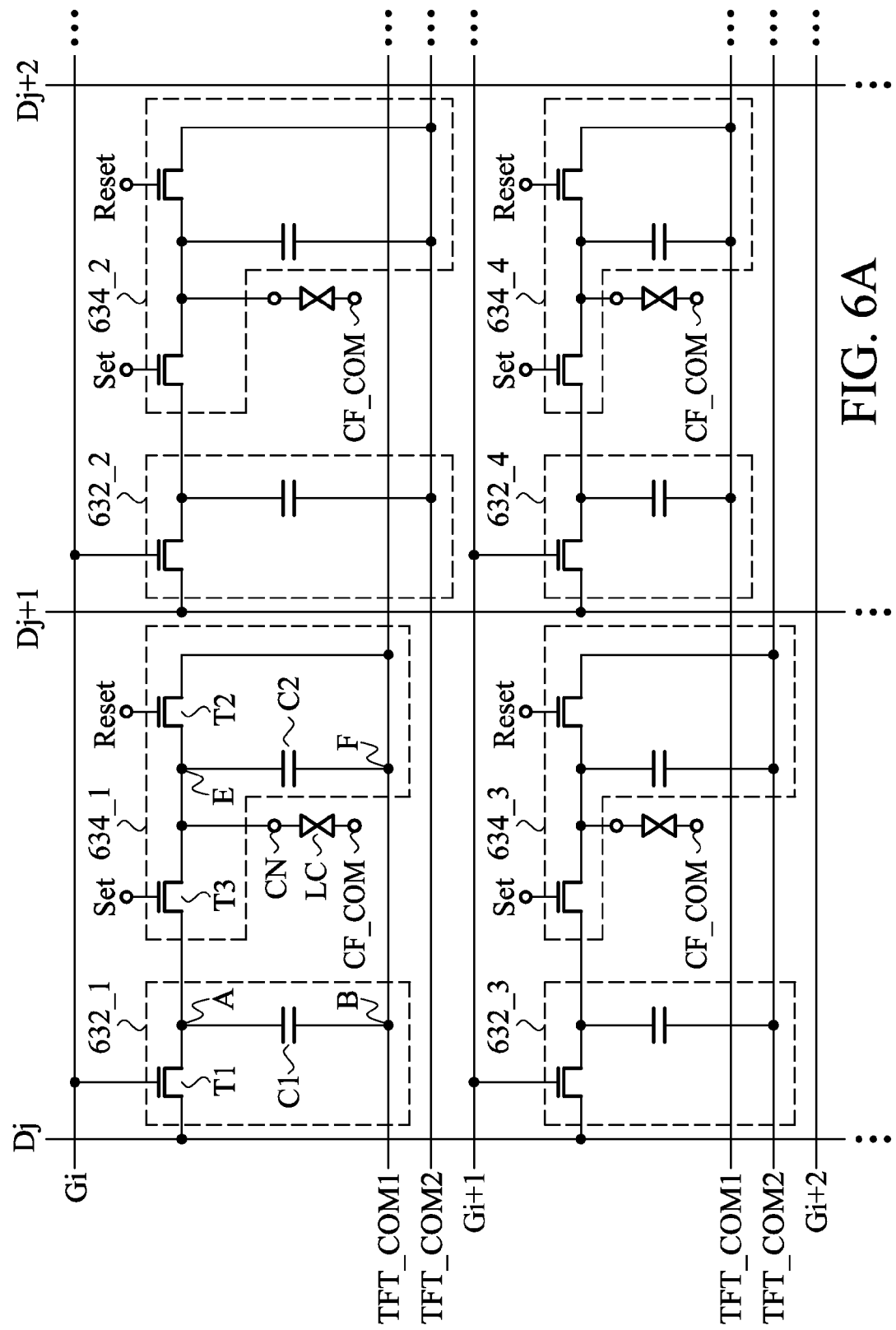
FIG. 6A illustrates a circuit of a pixel structure in accordance with another exemplary embodiment of the disclosure.

FIG. 6A illustrates a pixel structure in accordance with another exemplary embodiment of the disclosure. Note that no common electrode line providing a fixed voltage level (e.g., the aforementioned common electrode line TFT_COM) is shown. Instead, a first common electrode line TFT_COM1 and a second common electrode line TFT_COM2 at floating voltage levels are provided. Referring to the pixel coupled to the scan line Gi and data line Dj, there is a latch circuit 632_1 and a display circuit 634_1. In this pixel, the second terminal B of the first capacitor C1 and the second terminal F of the second capacitor C2 are both coupled to the first common electrode line TFT_COM1 while the second transistor T2 is coupled to the first common electrode line TFT_COM1 as well to use a first common electrode voltage transmitted by the first common electrode line TFT_COM1 as the reset voltage level. Referring to the pixel coupled to the scan line Gi and data line Dj+1, there is a latch circuit 632_2 and a display circuit 634_2, and the capacitors shown in the pixel structure are all coupled to the second common electrode line TFT_COM2 while a second common electrode voltage transmitted by the second common electrode line TFT_COM2 is used as the reset voltage level for the pixel. Referring to the pixel coupled to the scan line Gi+1 and the data line Dj, there is a latch circuit 632_3 and a display circuit 634_3, and the capacitors shown in the pixel structure are all coupled to the second common electrode line TFT_COM2 while the second common electrode voltage transmitted by the second common electrode line TFT_COM2 is used as the reset voltage level for the pixel. Referring to the pixel coupled to the scan line Gi+1 and data line Dj+1, there is a latch circuit 632_4 and a display circuit 634_4, and the capacitors shown in the pixel structure are all coupled to the first common electrode line TFT_COM1 while the first common electrode voltage transmitted by the first common electrode line TFT_COM1 is used as the reset voltage level for the pixel. Simply put, for each two adjacent pixels, when one pixel is coupled to the first common electrode line TFT_COM1, the other one is coupled to the second common electrode line TFT_COM2. The adjacent pixels are coupled to different common electrode lines.

Figure 6B:
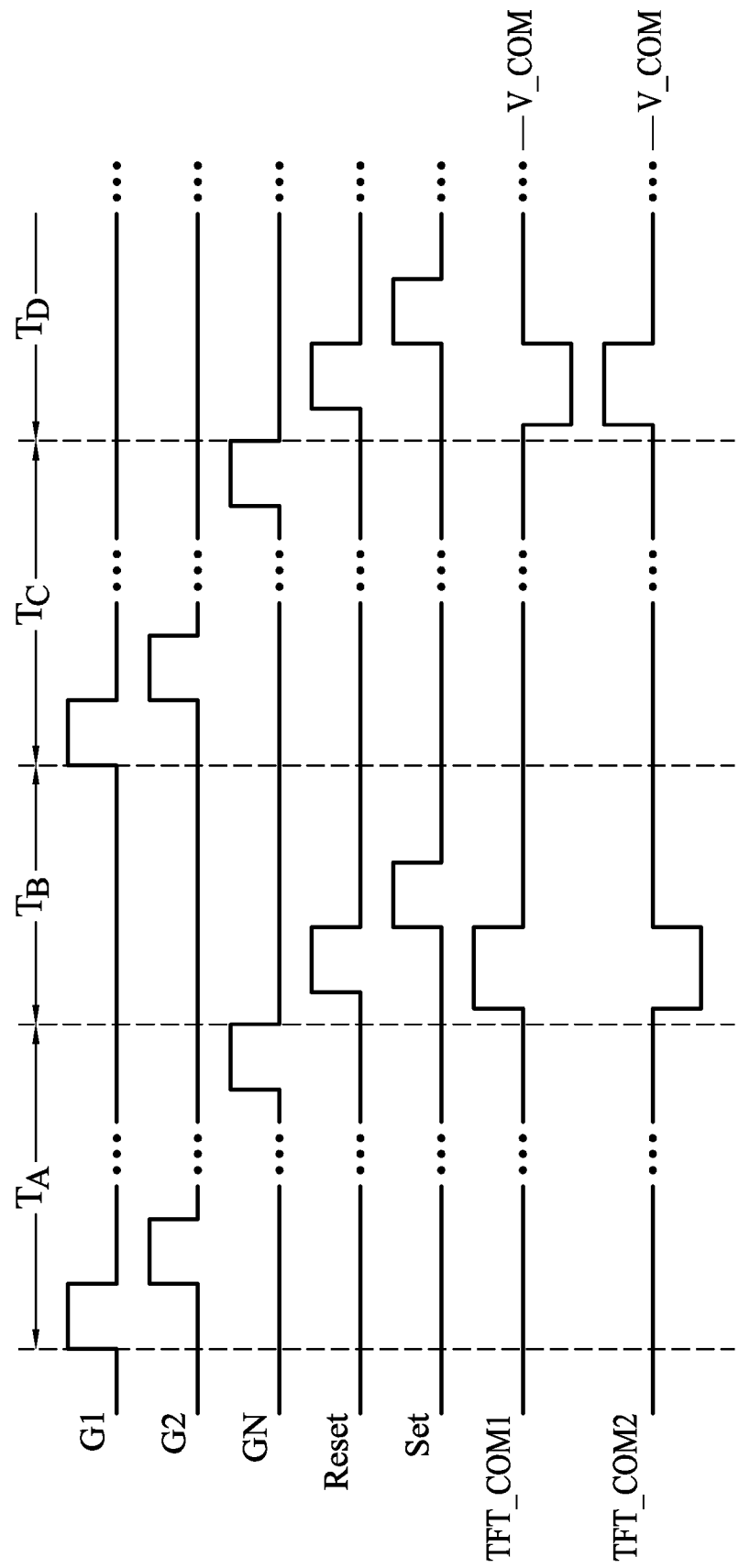
FIG. 6B is a timing diagram further depicting signals transmitted by the first common electrode line TFT_COM1 and the second common electrode line TFT_COM2 shown in FIG. 6A in accordance with an exemplary embodiment of the disclosure.

FIG. 6B is a timing diagram further depicting signals transmitted by the first common electrode line TFT_COM1 and the second common electrode line TFT_COM2. The first common electrode voltage (labeled TFT_COM1, the same as the first common electrode line) deviates from a fixed common voltage level V_COM to be of a positive polarity and negative polarity alternatively. Note that two successive deviations of at first common electrode voltage TFT_COM1 are in opposite polarities. The second common electrode voltage (labeled TFT_COM2, the same as the second common electrode line) deviates from the fixed common voltage level V_COM to be of a positive polarity and negative polarity alternatively. Note that the first and second common electrode voltages TFT_COM1 and TFT_COM2 are in opposite polarities. In this manner, the control terminal CN of the liquid crystal materials LC is pre-charged to a certain level during the enabling of the reset signal Reset. Therefore, a normal-sized first capacitor C1 is good enough to drive the control terminal CN of the liquid crystal materials LC to rotate the liquid crystal materials to the expected orientation. The positive/negative polarity switching is for polarity inversion of the liquid crystal materials. Because the first and second common electrode voltages TFT_COM1 and TFT_COM2 are maintained at the fixed common voltage level V_COM during the remaining of the time, it is workable to use the first and second common electrode lines TFT_COM1 and TFT_COM2 as common voltage sources for the capacitors shown in the pixel structure of FIG. 6A.

Figure 7A:
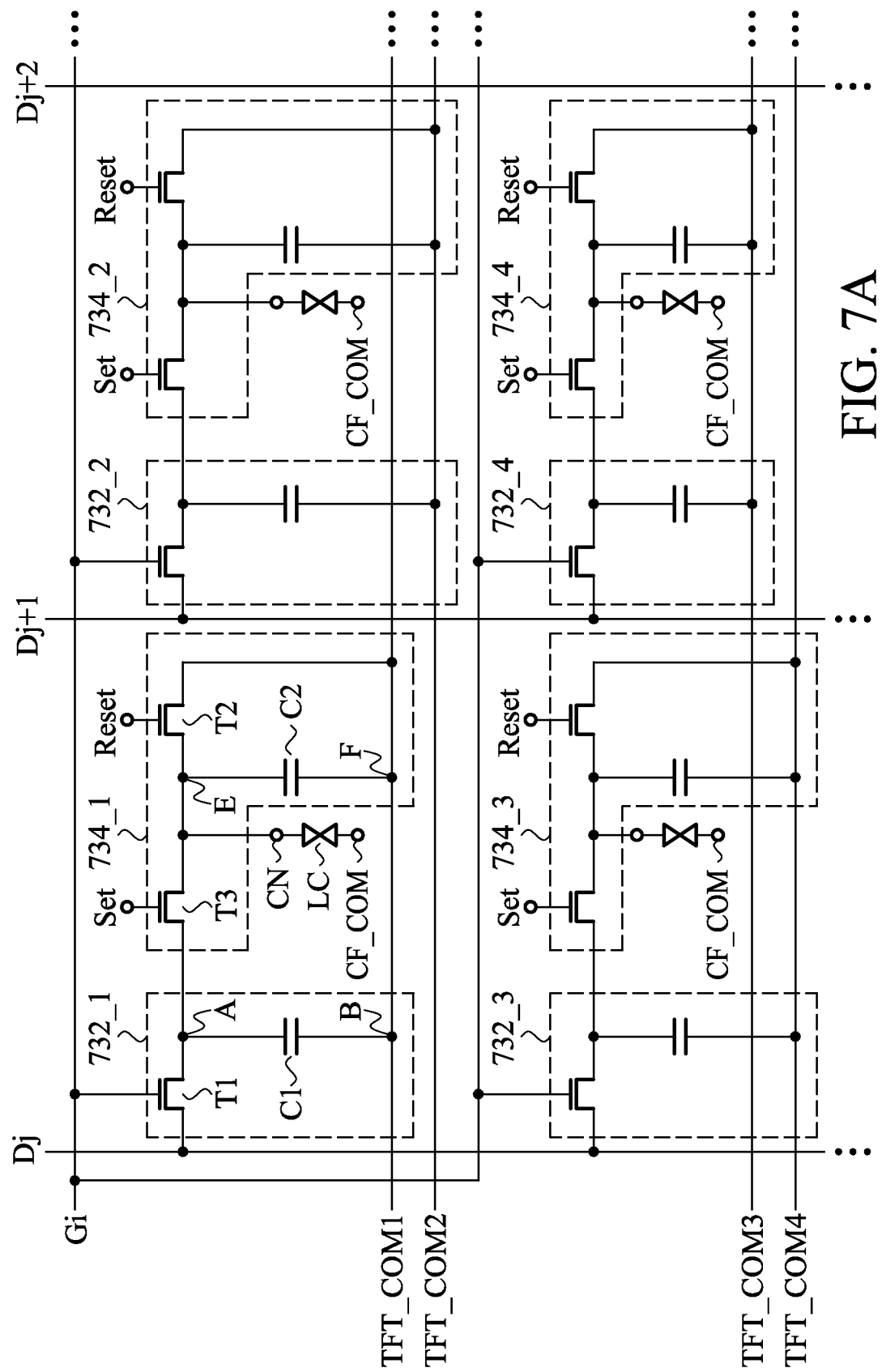
FIG. 7A illustrates a circuit of a pixel structure in accordance with another exemplary embodiment of the disclosure.

FIG. 7A further depicts a pixel structure in accordance with another exemplary embodiment of the disclosure, which involves multiple domain display technology. Note that no common electrode line providing a fixed voltage level (e.g., the aforementioned common electrode line TFT_COM) is shown. Instead, more than one common electrode lines, each at a floating voltage level, are provided. As shown, there is a first common electrode line TFT_COM1, a second common electrode line TFT_COM2, a third electrode line TFT_COM3 and a fourth electrode line TFT_COM4.

In the embodiment of FIG. 7A, two pixels are coupled to the scan line Gi and data line Dj to form one multiple domain display region, wherein, one of the two pixels includes a latch circuit 732_1 and a display circuit 734_1 while another one of the two pixels includes a latch circuit 732_3 and a display circuit 734_3. The structure for the multiple domain display region is discussed in detail as below. As shown, in the two pixels, the first TFTs are both controlled by the same scan line Gi and are both coupled to the same data line Dj. Note that different common electrode lines are coupled to the two pixels to provide different reset voltage levels for the two pixels. The upper pixel uses a first common electrode voltage provided at the first common electrode line TFT_COM1 as the reset voltage level. The lower pixel uses a fourth common electrode voltage at the fourth common electrode line TFT_COM4 as the reset voltage level. In the upper pixel, the first common electrode line TFT_COM1 is not only used as the source of the reset voltage level but all second terminals of the capacitors and the second TFT shown in the pixel structure are coupled to the first common electrode line TFT_COM1. In the lower pixel, the fourth common electrode line TFT_COM4 is not only used as the source of the reset voltage level but all second terminals of the capacitors and the second TFT shown in the pixel structure are coupled to the fourth common electrode line TFT_COM4.

FIG. 7A further shows another multiple domain display region, which contains two pixels both connected to the same scan line Gi and the same data line Dj+1. The upper pixel includes a latch circuit 732_2 and a display circuit 734_2 and the lower pixel includes a latch circuit 732_4 and a display circuit 734_4. In the two pixels, the first TFTs are both controlled by the same scan line Gi and are both coupled to the same data line Dj+1. Note that different common electrode lines are coupled to the two pixels to provide different reset voltage levels for the different two pixels. The upper pixel uses a second common electrode voltage provided at the second common electrode line TFT_COM2 as the reset voltage level. The lower pixel uses a third common electrode voltage at the third common electrode line TFT_COM3 as the reset voltage level. In the upper pixel, the second common electrode line TFT_COM2 is not only used as the source of the reset voltage level but all second terminals of the capacitors and second TFT shown in the pixel structure are coupled to the second common electrode line TFT_COM2. In the lower pixel, the third common electrode line TFT_COM3 is not only used as the source of the reset voltage level but all second terminals of the capacitors and second TFT shown in the pixel structure are coupled to the third common electrode line TFT_COM3.

Figure 7B:
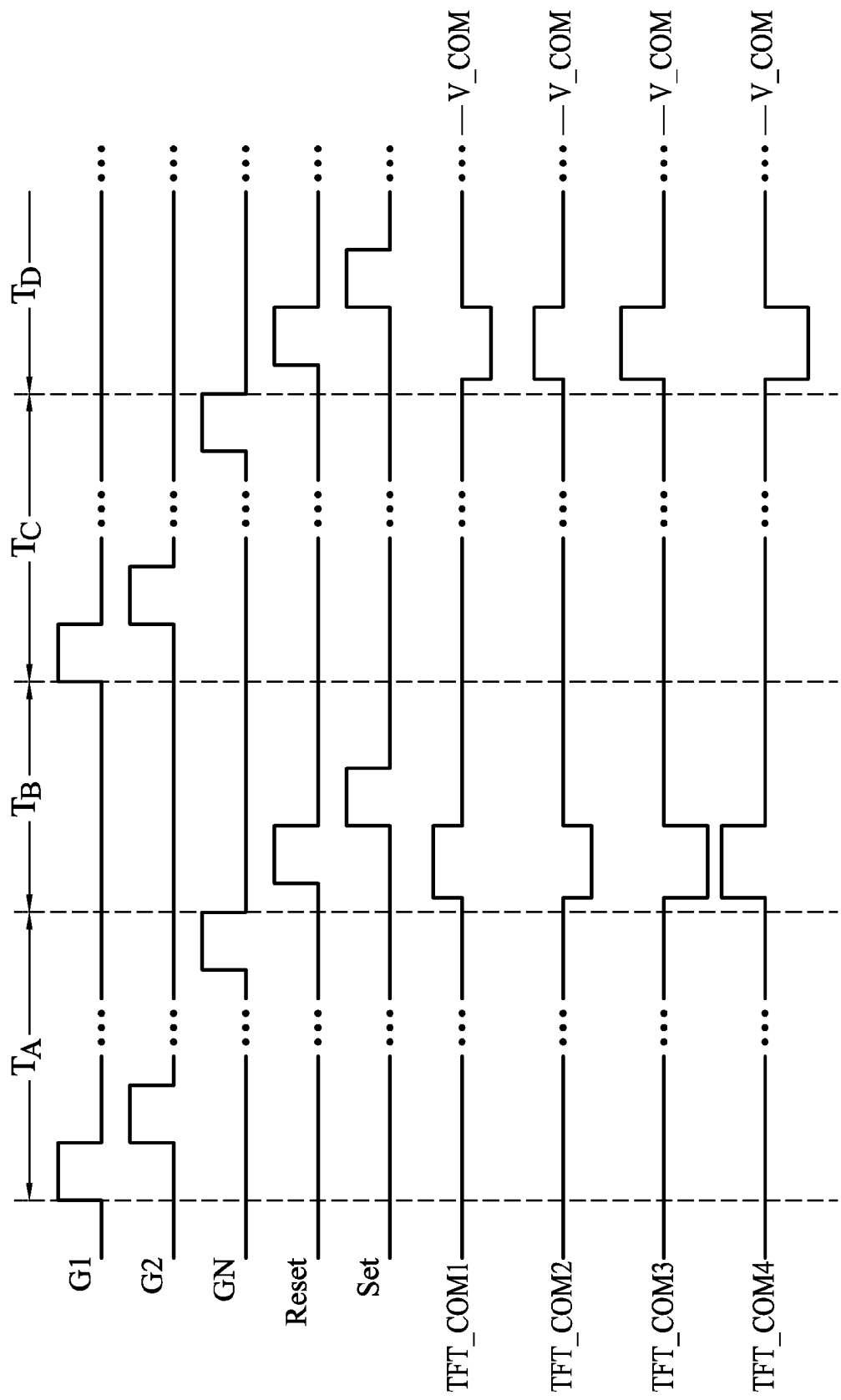
FIG. 7B is a timing diagram further depicting signals transmitted by the first to fourth common electrode lines TFT_COM1 to TFT_COM4 shown in FIG. 7A in accordance with an exemplary embodiment of the disclosure.

FIG. 7B is a timing diagram further depicting the signals transmitted by the first to the fourth common electrode lines TFT_COM1-TFT_COM4. The signals are discussed in details as below.

Referring to the multiple domain display region coupled to the scan line Gi and data line Dj, the first and the fourth common electrode lines TFT_COM1 and TFT_COM4 coupled to the pixels within this region convey in-phase signals. When the reset signal Reset is in an enable state, the in-phase signals on the first and the fourth common electrode lines TFT_COM1 and TFT_COM4 deviate from a fixed common voltage level V_COM to be of a positive polarity and negative polarity alternatively. Note that two subsequent deviations are of opposite polarities, and the deviation magnitude at the first common electrode line TFT_COM1 is different from the deviation magnitude at the fourth common electrode line TFT_COM4. By shifting the reset voltage level from the fixed common voltage level, the control terminal CN of the liquid crystal materials LC is pre-charged to a level during the enabling of the reset signal Reset. Therefore, a normal-sized first capacitor C1 is good enough to drive the control terminal CN of the liquid crystal materials LC to rotate the liquid crystal materials to the expected orientation. Because the deviation magnitude at the first common electrode line is different from the deviation magnitude at the fourth common electrode line, the two pixels within the multiple domain display region respond differently to the same data line signal. Thereby, the liquid crystal materials of the two pixels are rotated to two distinct orientations to realize the multiple domain display technology. The positive/negative polarity switching is for polarity inversion of liquid crystal materials. Because the first and fourth common electrode voltages TFT_COM1 and TFT_COM4 are maintained at the fixed common voltage level V_COM during the remaining of the time, it is workable to use the first and fourth common electrode lines TFT_COM1 and TFT_COM4 as common voltage sources of the capacitors shown in the figure.

Referring to the multiple domain display region coupled to the scan line Gi and data line Dj+1, the second and the third common electrode lines TFT_COM2 and TFT_COM3 are operated similarly to the first and fourth common electrode lines TFT_COM1 and TFT_COM4. It has to be noted that for polarity inversion of the liquid crystal materials, the signals transmitted by the second and third common electrode lines TFT_COM2 and TFT_COM3 are of an opposite phase in comparison with the signals transmitted by the first and fourth common electrode lines TFT_COM1 and TFT_COM4. Simply put, the pixels coupled to the same scan line and the same data line are coupled to in-phase common electrode voltages having different deviation magnitudes. As for the two pixels coupled to the same scan line and the two adjacent data lines, they are coupled to two common electrode voltages in opposite phases with each other.

In addition to the aforementioned pixel structure, an image display method for the aforementioned pixel structure is discussed in this paragraph. By the image display method, liquid crystal materials associated with one pixel of a pixel array within a liquid crystal display panel are driven. This method includes the following steps: receiving and temporarily storing a data line signal in accordance with a scan line signal; resetting a voltage level at a control terminal of the liquid crystal materials according to a reset signal; and receiving the temporarily stored data line signal in accordance with a set signal to thereby adjust the voltage level at the control terminal to control rotations of the liquid crystal materials to show the image of the pixel. Note that the reset signal is enabled after a scan line signal of a last row is disabled and before the set signal is enabled.

Note that the aforementioned 3D image display does not intend to limit the scope of the disclosure. The disclosed pixel structure and operation techniques may be used in 2D image display as well.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image display system, comprising a liquid crystal display panel having a plurality of scan lines, a plurality of data lines and a pixel array defined by the scan lines and the data lines, wherein each pixel of the pixel array comprises:
    a latch circuit, receiving and temporarily storing a data line signal transmitted by a data line corresponding to the pixel according to a scan line signal transmitted by the scan line corresponding to the pixel; and
    a display circuit, resetting a voltage level of a control terminal of liquid crystal materials connected to the display circuit according to a reset signal, and receiving the data line signal temporarily stored in the latch circuit according to a set signal to adjust the voltage level of the control terminal to control rotations of the liquid crystal materials and thereby displaying images of the pixel, wherein the reset signal is enabled after the scan line signal of a last row of the pixel array is disabled and before the set signal is enabled,
wherein:
    the latch circuit of each pixel comprises:
        a first capacitor, having a first terminal and a second terminal opposite to the first terminal; and
        a first thin film transistor, controlled by the scan line signal corresponding to the pixel, to couple the data line signal corresponding to the pixel to the first terminal of the first capacitor;
    the display circuit of each pixel comprises:
        a second thin film transistor, controlled by the reset signal, to reset the voltage level of the control terminal of the liquid crystal materials corresponding to the pixel to a reset voltage level; and
        a third thin film transistor, controlled by the set signal, to couple the first terminal of the first capacitor of the latch circuit corresponding to the pixel to the control terminal of the liquid crystal materials corresponding to the pixel; and
    the liquid crystal display panel further comprises:
        a common electrode line, coupled to the second terminal of the first capacitor of each pixel of the pixel array to provide a fixed voltage; and
        a first signal line and a second signal line, coupled to the second thin film transistors of two adjacent pixels, respectively, and providing a first signal and a second signal to the corresponding pixels, respectively, wherein the first signal and the second signal are in opposite phases with each other.

2. The image display system as claimed in claim 1, further comprising:
    a backlight module disposed at the back of the liquid crystal display panel to provide light to the liquid crystal display panel after steady states of the rotation of the liquid crystal materials.

3. The image display system as claimed in claim 2, wherein when the reset signal is switched to be enabled, the backlight module is turned off.

4. The image display system as claimed in claim 1, further comprising a pair of 3D glasses having a glass for the left eye and a glass for the right eye, wherein:
    when a left eye image received and temporarily stored in each latch circuit of the pixel array is received by each display circuit of the pixel array, the glass for the right eye of the 3D glasses is turned off and the glass for the left eye of the 3D glasses is turned on; and
    when a right eye image received and temporarily stored in each latch circuit is received by each display circuit, the glass for the right eye is turned on and the glass for the left eye is turned off.

5. The image display system as claimed in claim 1, wherein the display circuit of each pixel further comprises:
    a second capacitor, having a first terminal coupled to the control terminal of the liquid crystal materials of the pixel and a second terminal coupled to the common electrode line.

6. An image display system, comprising a liquid crystal display panel having a plurality of scan lines, a plurality of data lines and a pixel array defined by the scan lines and the data lines, wherein each pixel of the pixel array comprises:
    a latch circuit, receiving and temporarily storing a data line signal transmitted by a data line corresponding to the pixel according to a scan line signal transmitted by the scan line corresponding to the pixel; and
    a display circuit, resetting a voltage level of a control terminal of liquid crystal materials connected to the display circuit according to a reset signal, and receiving the data line signal temporarily stored in the latch circuit according to a set signal to adjust the voltage level of the control terminal to control rotations of the liquid crystal materials and thereby displaying images of the pixel, wherein the reset signal is enabled after the scan line signal of a last row of the pixel array is disabled and before the set signal is enabled,
wherein:
    the latch circuit of each pixel comprises:
        a first capacitor, having a first terminal and a second terminal opposite to the first terminal; and
        a first thin film transistor, controlled by the scan line signal corresponding to the pixel, to couple the data line signal corresponding to the pixel to the first terminal of the first capacitor;

the display circuit of each pixel comprises:
a second thin film transistor, controlled by the reset signal, to reset the voltage level of the control terminal of the liquid crystal materials corresponding to the pixel to a reset voltage level; and
a third thin film transistor, controlled by the set signal, to couple the first terminal of the first capacitor of the latch circuit corresponding to the pixel to the control terminal of the liquid crystal materials corresponding to the pixel; and the liquid crystal display panel further comprises:
a first common electrode line, coupled to one pixel selected from two adjacent pixels to connect to the second terminal of the first capacitor and the second thin film transistor therein, and providing a first common electrode voltage; and
a second common electrode line, coupled to the remaining pixel of the two adjacent pixels to connect to the second terminal of the first capacitor and the second thin film transistor therein, and providing a second common electrode voltage,
wherein, according to the enabling of the reset signal, the first common electrode voltage is switched to a positive polarity and negative polarity alternatively, and the second common electrode voltage is switched to a positive polarity and negative polarity alternatively and the first common electrode voltage and the second common electrode voltage are in opposite phases with each other.

7. The image display system as claimed in claim 6, wherein the display circuit of each pixel further comprises:
a second capacitor, having a first terminal and a second terminal, wherein the first terminal is coupled to the control terminal of the liquid crystal materials of the pixel, and the second terminal is coupled to one of the first and second common electrode lines which the second terminal of the first capacitor of the pixel is coupled to.

8. An image display system, comprising a liquid crystal display panel having a plurality of scan lines, a plurality of data lines and a pixel array defined by the scan lines and the data lines, wherein each pixel of the pixel array comprises:
a latch circuit, receiving and temporarily storing a data line signal transmitted by a data line corresponding to the pixel according to a scan line signal transmitted by the scan line corresponding to the pixel; and
a display circuit, resetting a voltage level of a control terminal of liquid crystal materials connected to the display circuit according to a reset signal, and receiving the data line signal temporarily stored in the latch circuit according to a set signal to adjust the voltage level of the control terminal to control rotations of the liquid crystal materials and thereby displaying images of the pixel, wherein the reset signal is enabled after the scan line signal of a last row of the pixel array is disabled and before the set signal is enabled, wherein:
the latch circuit of each pixel comprises:
a first capacitor, having a first terminal and a second terminal opposite to the first terminal; and
a first thin film transistor, controlled by the scan line signal corresponding to the pixel, to couple the data line signal corresponding to the pixel to the first terminal of the first capacitor;

the display circuit of each pixel comprises:
a second thin film transistor, controlled by the reset signal, to reset the voltage level of the control terminal of the liquid crystal materials corresponding to the pixel to a reset voltage level; and
a third thin film transistor, controlled by the set signal, to couple the first terminal of the first capacitor of the latch circuit corresponding to the pixel to the control terminal of the liquid crystal materials corresponding to the pixel; and the liquid crystal display panel further comprises:
several sets of common electrode lines, wherein, in each set, the common electrode lines correspond to a plurality of pixels within one multiple domain display region of the liquid crystal display panel and provide a plurality of common electrode voltages, respectively, and each of the common electrode lines is coupled to the corresponding pixel at the second terminal of the first capacitor and at the second thin film transistor thereof,
wherein, for the pixels coupled to the same scan line and the same data line, the common electrode voltages coupled thereto are in phase but have different deviation magnitudes and, for the pixels coupled to the same scan line but adjacent data lines, the common electrode voltages coupled thereto are in opposite phases.

9. The image display system as claimed in claim 8, wherein the display circuit of each pixel further comprises:
a second capacitor, having a first terminal and a second terminal, wherein the first terminal is coupled to the control terminal of the liquid crystal materials of the pixel, and the second terminal is coupled to the electrode line which the second terminal of the first capacitor of the pixel is coupled to.

* * * * *